US011841086B2

(12) United States Patent
Domingo et al.

(10) Patent No.: US 11,841,086 B2
(45) Date of Patent: Dec. 12, 2023

(54) COMBINATION VALVE

(71) Applicant: Marshall Excelsior Co., Marshall, MI (US)

(72) Inventors: Franco J Domingo, Marshall, MI (US); Jonathan W. Sanders, Portage, MI (US); Sean Leister, Coldwater, MI (US)

(73) Assignee: Marshall Excelsior Co., Marshall, MI (US)

(*) Notice: Subject to any disclaimer, the term of this patent is extended or adjusted under 35 U.S.C. 154(b) by 130 days.

(21) Appl. No.: 17/215,027

(22) Filed: Mar. 29, 2021

(65) Prior Publication Data

US 2021/0301934 A1 Sep. 30, 2021

Related U.S. Application Data

(60) Provisional application No. 63/001,618, filed on Mar. 30, 2020.

(51) Int. Cl.
| | |
|---|---|
| *F16K 11/22* | (2006.01) |
| *B01D 29/33* | (2006.01) |
| *F16K 39/02* | (2006.01) |
| *F16K 51/00* | (2006.01) |
| *F16K 27/02* | (2006.01) |

(52) U.S. Cl.
CPC .............. *F16K 11/22* (2013.01); *B01D 29/33* (2013.01); *F16K 39/02* (2013.01); *B01D 2201/165* (2013.01); *F16K 27/02* (2013.01); *F16K 39/024* (2013.01); *F16K 51/00* (2013.01)

(58) Field of Classification Search
CPC ........ F16K 11/22; F16K 39/02; F16K 39/024; F16K 27/02; F16K 51/00; B01D 29/33; B01D 2201/165

USPC ..... 137/549, 140, 289, 300, 315.27, 315.39, 137/626, 613, 614, 205, 206, 118.02; 251/82, 83, 282
See application file for complete search history.

(56) References Cited

U.S. PATENT DOCUMENTS

| | | | | |
|---|---|---|---|---|
| 4,736,766 | A * | 4/1988 | Bathrick | B01D 35/153 137/315.27 |
| 4,776,365 | A * | 10/1988 | Bathrick | F16K 1/02 137/329.02 |
| 4,925,196 | A * | 5/1990 | Green | F02D 17/04 180/170 |

(Continued)

FOREIGN PATENT DOCUMENTS

WO WO-2020100201 A1 * 5/2020 ......... B60H 1/00485

OTHER PUBLICATIONS

Marshall Excelsior Company, "ME992-121-1/2" Threaded Internal Valve Installation and Operating Manual," Form #1130 ME992-12IOM, Rev. B, Marshall, MI (May 8, 2019).

*Primary Examiner* — Minh Q Le
(74) *Attorney, Agent, or Firm* — Howard & Howard Attorneys PLLC

(57) ABSTRACT

A valve assembly includes a housing body defining a first opening, a second opening and an internal chamber. A first mechanism is provided in the housing body to control fluid between the first opening and the interior chamber and a second mechanism is provided in the housing body to control fluid between the second opening and the interior chamber. The first and second control mechanisms operate independently.

19 Claims, 6 Drawing Sheets

(56) References Cited

U.S. PATENT DOCUMENTS

| | | | | |
|---|---|---|---|---|
| 5,230,366 A * | 7/1993 | Marandi | ............... | F16K 27/067 |
| | | | | 137/613 |
| 5,553,638 A * | 9/1996 | Home | .................... | F16L 29/02 |
| | | | | 251/149.6 |
| 6,155,285 A * | 12/2000 | Hsiao | ................... | F16K 17/383 |
| | | | | 137/460 |
| 6,530,394 B2 * | 3/2003 | Pai | ......................... | F16K 15/18 |
| | | | | 137/454.2 |
| 7,604,021 B2 * | 10/2009 | Ootomo | ............... | F01D 17/145 |
| | | | | 137/625.3 |
| 9,133,941 B2 * | 9/2015 | Lin | ........................ | F16K 1/126 |
| 9,581,228 B2 * | 2/2017 | Nashery | ............... | F16K 39/024 |
| 2006/0070666 A1 * | 4/2006 | Takemaru | ............... | F16K 47/08 |
| | | | | 137/549 |
| 2010/0170585 A1 * | 7/2010 | Nimberger | ............. | F16L 19/02 |
| | | | | 137/539 |
| 2010/0252770 A1 * | 10/2010 | Lin | .................. | F16K 31/52408 |
| | | | | 251/251 |
| 2014/0299209 A1 * | 10/2014 | Oh | ....................... | F16K 15/026 |
| | | | | 137/613 |

* cited by examiner

COMBINATION VALVE

BACKGROUND

1. Field of the Invention

The present disclosure relates to a multifunctional combination valve assembly for transferring fluid, and more specifically to an integrated multifunctional combination valve assembly.

2. Description of the Related Art

Valve assemblies are used for regulating flow in the transfer of fluid in or through a pipeline system. A valve assembly may include a housing body defining an inlet and an outlet, with a moveable member controlling the flow of a fluid between the inlet and the outlet. The moveable member may include a valve seal to engage with a portion of the housing body when in a first closed position to block fluid flow between the inlet and the outlet. In a second opened position, the valve seal of the moveable member is spaced apart from the housing body to open a space allowing fluid to flow between the inlet and the outlet.

Pipeline systems typically include multiple assemblies performing different functions for controlling the fluid flow through the pipeline system. Conventional assemblies are typically limited to a single function with connections to the pipeline system at each end of the assembly. This requires each assembly to be connected through multiple pipe segments requiring joints such as welds or threaded interfaces to transition between the assemblies. This requires high utilization of space and materials. Spacing requirements and component geometries may also require bends and sizing changes in the fluid flow pathway that create flow restrictions or turbulence. Additional components, such as filters or strainers may also be present in the fluid flow pathway that also contribute to flow restrictions or turbulence in the fluid flow. Interference in the fluid flow due to restrictions or turbulence can produce energy loss and inefficiencies that decrease fluid flow performance or otherwise requiring increased size or power in pumping components associated with the pipeline system. Therefore, it would be desirable to reduce flow restrictions, minimize or eliminate component interface joints, decrease weight and size requirements and improve fluid flow characteristics through the pipeline system.

BRIEF DESCRIPTION OF THE DRAWINGS

Advantages of the present disclosure will be readily appreciated, as the same becomes better understood by reference to the following detailed description, when considered in connection with the accompanying drawings, wherein.

DETAILED DESCRIPTION

Figure 1:
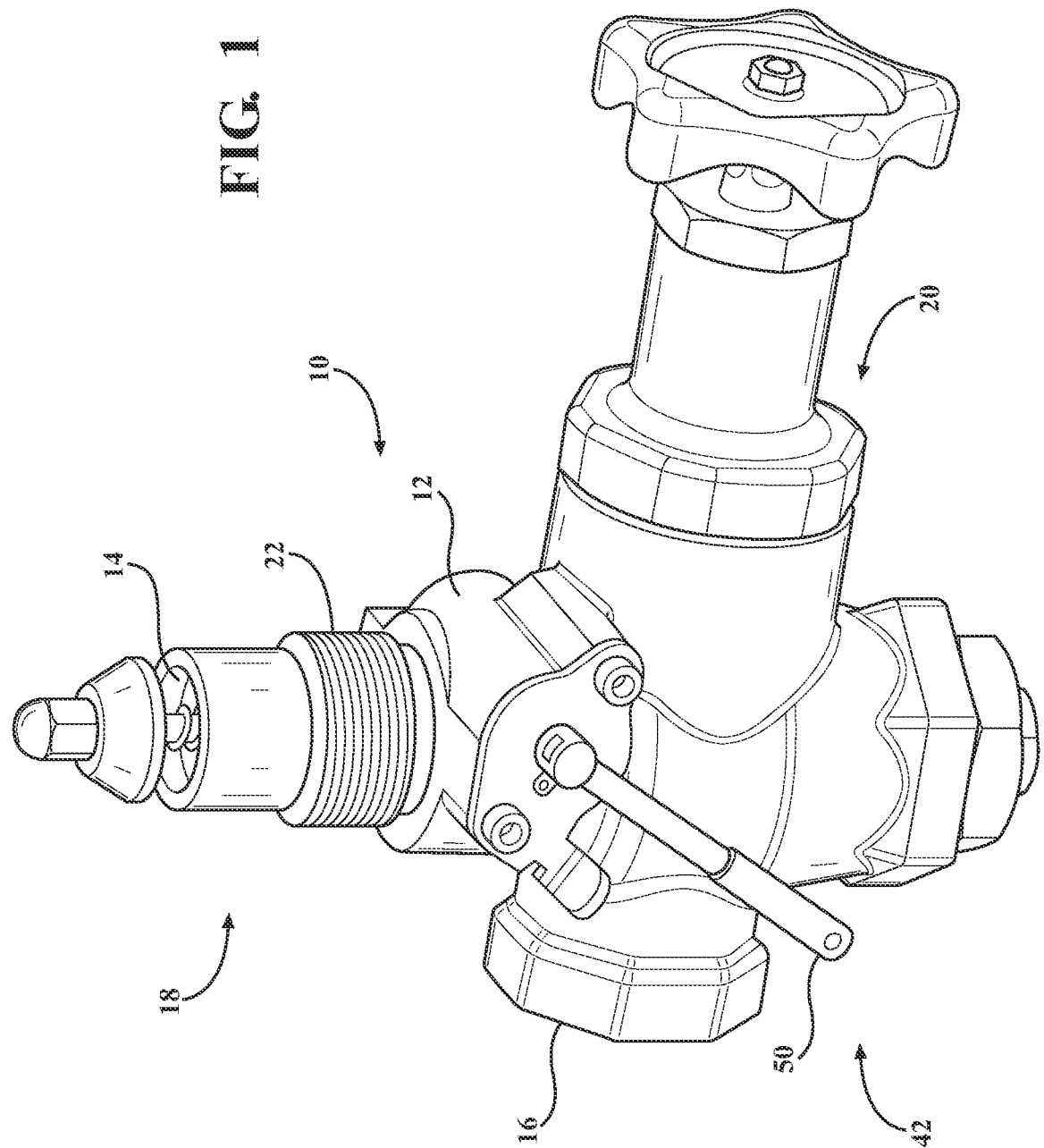
FIG. 1 is a perspective view of a combination valve assembly.

Referring to the Figures, wherein like numerals indicate like or corresponding parts throughout the several views, a combination valve is generally shown at 10. Referring to FIG. 1, the combination valve 10 includes a housing body 12 defining a first opening 14 and a second opening 16. The combination valve 10 includes a first control portion 18 for controlling a fluid flow between the first opening 14 to an internal volume of the housing body 12 and a second control portion 20 for controlling fluid flow between the second opening 16 and the internal volume of the housing body. The combination valve 10 provides multifunction control of fluid flow within a single housing body 12 without requiring additional interfaces or connections between different functional components.

The combination valve 10 may be mounted to a tank (not shown) storing the fluid. In the depicted arrangement, the combination valve 10 mounts to a tank via the external threads 22 on the housing body 12. The storage tank includes an opening with corresponding internal threads for receiving the valve assembly 10. The valve assembly 10 may be mounted to an inlet or outlet of the tank for filling or withdrawing fluid from the tank. For convenience of reference herein, the combination valve is assumed to be mounted to an outlet of the tank so that the first opening 14 is the inlet of the fluid into the combination valve 10 and the second opening 16 is the outlet of the fluid from the combination valve 10.

The tank may be a stationary tank or else may be a tank of a transport truck. The combination valve 10 may be utilized to manipulated fluid transfer of liquid petroleum gas (LP-Gas, LPG), anhydrous ammonia ($NH_3$), or any other suitable fluid. In some alternatives, the liquid may include propane, compressed nitrogen, or other petrochemicals. The combinational valve 10 may advantageously be used in connection with transportation tanks such as on a bobtail truck. In other alternatives, the tank may be a stationary tank providing bulk plant applications.

Depending on the intended application, the combination valve 10 in alternative arrangements may include a mounting flange (not shown) in place of the external threads 22. In further alternatives, the combination valve 10 may include other mounting features and any suitable method may be utilized to secure the combination valve 10 to the service application. In yet further alternatives, the combination valve may be used in connection with other fluid storage or fluid communication systems beyond storage or transport tanks. In similar fashion, the second opening 16 illustrated as threaded to receive a pipe interface may be provided with alternative features for other connection styles. For example, the second opening 16 may be provided with external rather than internal threads. In other alternatives, the second opening 16 may be provided with a flange, a press-fit connection, a weld connection, or any other suitable connection style for piping or pipeline systems.

Figure 2:
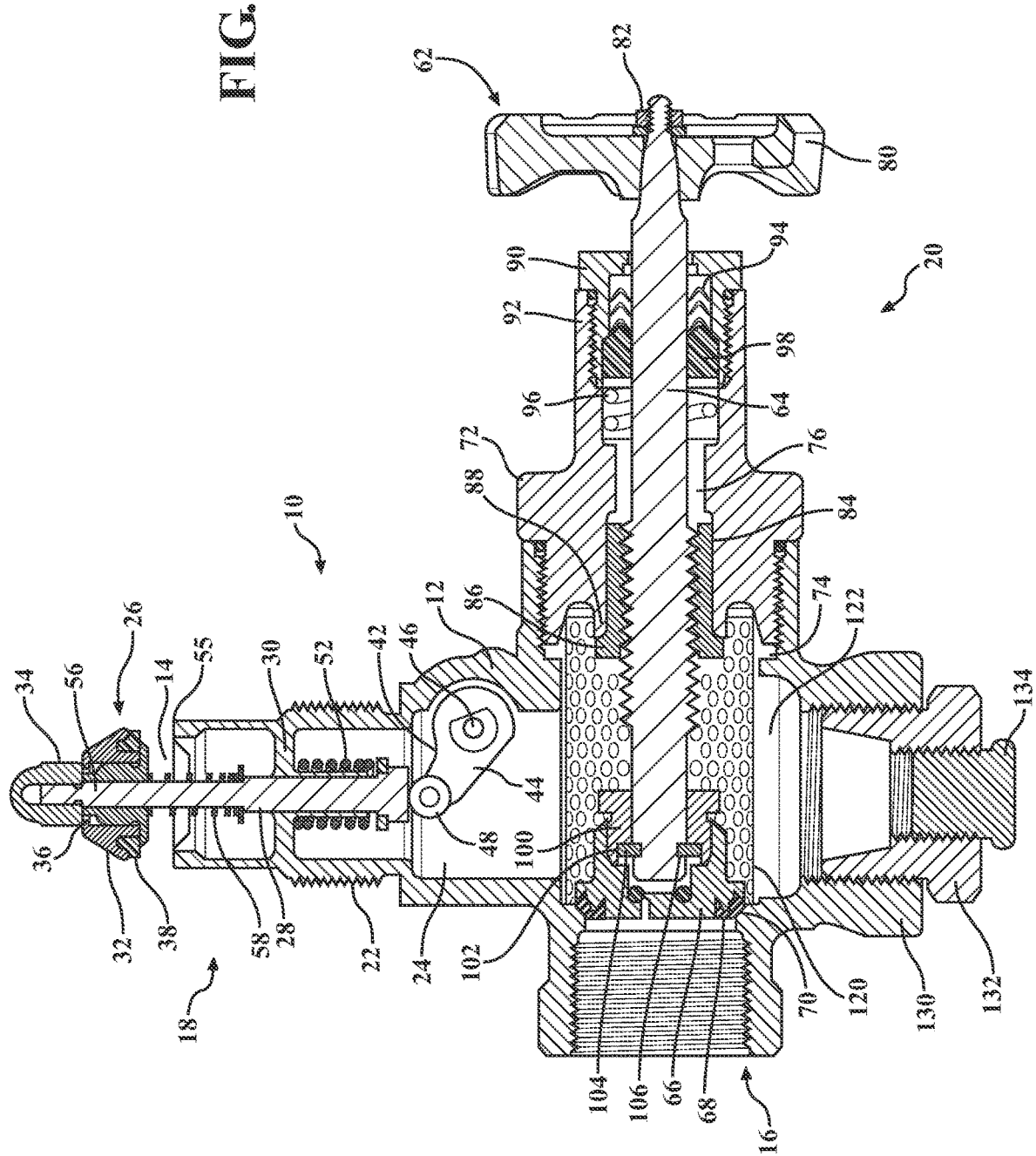
FIG. 2 is a vertical cross-sectional view of the combination valve assembly of FIG. 1 with a first control portion in an open position and a second control portion in a closed position.

Shown in greater detail in FIG. 2, the combination valve 10 includes the first control portion 18. When installed, for example, to a storage tank, the first control portion 18 penetrates into the interior of the storage tank and is an internal valve. The first control portion may be understood as similar to what is known in the industry as an internal valve. The first control portion 18 includes a first valve member 26. The first valve member 26 may be a poppet. The first valve member 26 is movable relative to the housing body 12 and includes a first valve stem 28 extending from an interior chamber 24 defined within the housing body 12. The first valve member 26, or poppet may be moveable in a linear displacement along the direction defined by the longitudinal axis of the first valve stem 28.

A stem guide 30 is provided in the interior chamber 24 to guide the first valve stem 28. A valve holder 32 is supported on the first valve stem 28. The valve holder 32 is retained to the first valve stem 28 by a nut 34. The valve holder 32 includes an excess flow seal 36 and a first valve seal 38. A seal retainer 40 cooperates with the valve holder 32 to secure the excess flow seal 36 and the first valve seal 38 in place.

The first control portion 18 is moveable relative to the housing body 12 between an open position and a closed position by operation of an actuator 42. An example of an actuator 42 may be found in U.S. Pat. No. 9,476,518, issued Oct. 25, 2016, the disclosure of which is incorporated by reference in its entirety herein. In the open position, the valve holder 32 is spaced apart from the housing body 12 and permits fluid communication between the first opening 14 and the interior chamber 24. In the closed position, first control portion 18 prevents fluid communication between the first opening 14 and the interior chamber 24. The actuator 42 includes a cam 44 supported on a cam stem 46 for rotation relative to the housing body 12. The cam 44 includes a roller 48 at the end of the cam 44 in contact with the first valve stem 28. Operation of the actuator 42 rotates the cam 44 which translates the first valve stem 28 along its axis as guided by the stem guide 30. The actuator 42 may provide a handle 50 for manual operation. In other alternatives, the actuator 42 may be mechanically coupled to an automatic, pneumatic, hydraulic or other type of control.

The movement of the first valve stem 28 by the actuator 42 is resisted by the valve spring 52. The valve spring 52 is captured between the stem guide 30 and a washer 54 supported on the first valve stem 28. As the actuator 42 operates to rotate the cam 44 clockwise, as illustrated in the Figures, extending the first valve stem 28, the valve spring 52 is compressed and creates a downward force on the first valve stem 28. When the actuator operates to rotate the cam 44 counterclockwise, as illustrated in the Figures, the force of the cam 44 on the first valve stem 28 is removed, and the valve spring 52 imparts a force, or biases, to retract the first valve stem 28. This configuration is illustrated in the cam 44 position shown in FIG. 4.

Figure 4:
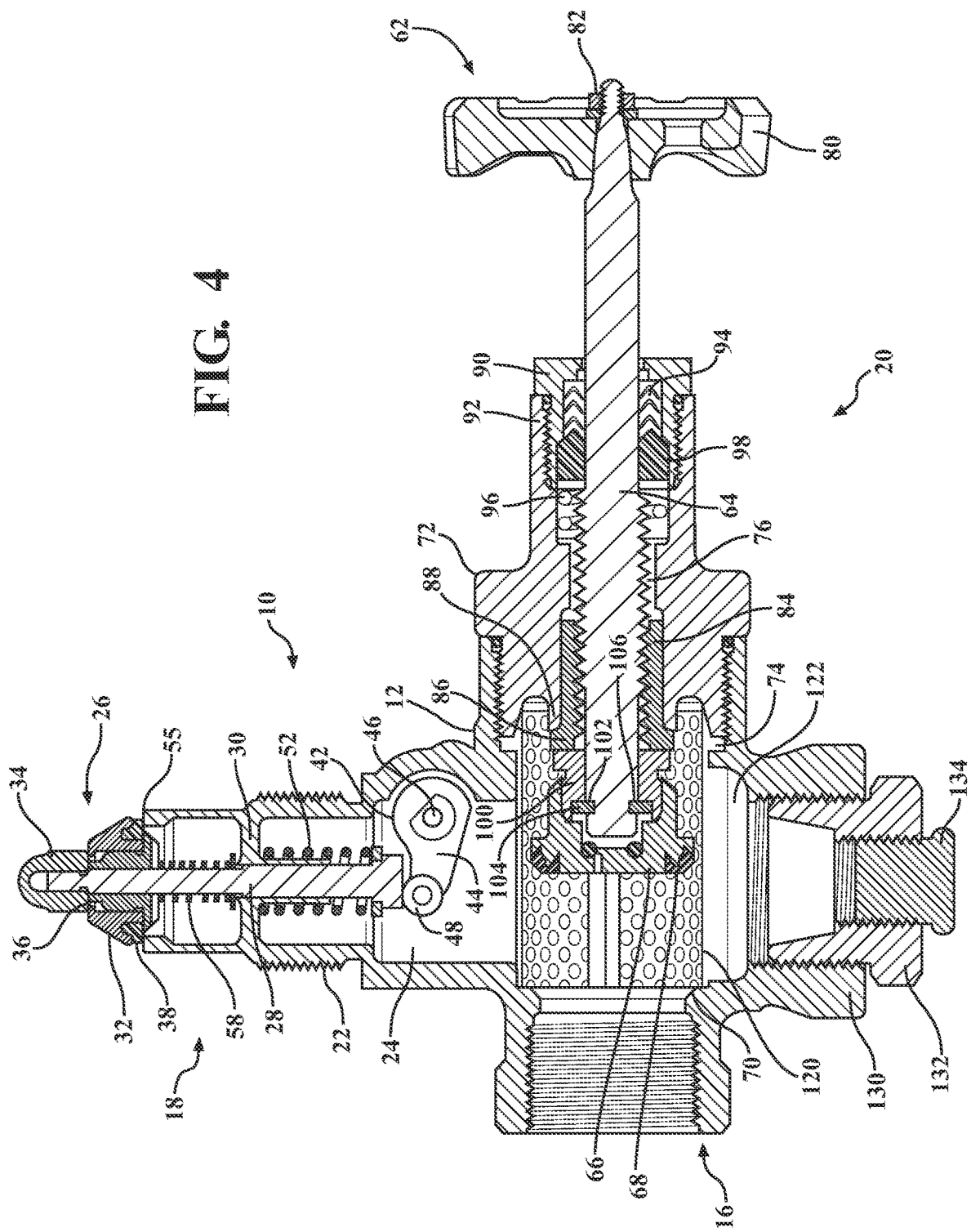
FIG. 4 is a vertical cross-sectional view of the combination valve assembly of FIG. 1 with a first control portion in a closed position and the second control portion in the open position.

In FIG. 4, the cam 44 is rotated so that the first valve stem 28 is retracted and the valve spring 52 is expanded. In the configuration of FIG. 4, the first valve stem 28 draws the valve holder 32 downwards and the first valve seal 38 is in contact with an external valve seat 55 of the housing body 12. The nut 34 at the end of the first valve stem 28 is in contact with the excess flow seal 36 in this configuration, fully closing the first opening 14. In an application where the combination valve 10 is mounted to a storage tank, a fluid pressure in the tank higher than the fluid pressure in the interior chamber 24 serves to urge the valve holder 32 against the housing body 12 at the external valve seat 55, maintaining the first control portion 18 in the closed configuration.

The first control portion 18 also provides a pilot valve operation and excess flow protection. When the actuator 42 is operated to move the first control portion 18 from the closed configuration illustrated in FIG. 4 to the open configuration illustrated in FIG. 2, the fluid pressure difference between the interior chamber 24 and the tank may cause a resistance to opening at the valve holder 32, keeping the valve holder in place against the external valve seat 55. To counteract this resistance, the combination valve 10 may provide a pilot bleed feature allowing rapid equalization in pressure between the tank and the internal chamber 24.

The first control portion 18 is opened by moving the actuator 42 to urge the first valve stem 28 and move the nut 34 away from the excess flow seal 36. The first valve stem 28 may include a rapid equalization portion 56 allowing fluid to flow between nut 34 and the excess flow seal 36 to increase the fluid pressure in the interior chamber 24. The rapid equalization portion 56 may include a constriction in the diameter of the first valve stem 28, or may include a perforation, channel, or groove. In other configurations, the rapid equalization portion 56 may include another feature or features to allow fluid past the excess flow seal 36 when the rapid equalization portion 56 is adjacent the excess flow seal 36. As the fluid pressure in the interior chamber 24 increases, toward equalization with the tank pressure, the valve holder 32 may be moved out of contact with the housing body 12 by the force, or bias, of the compressed excess flow spring 58.

The excess flow spring 58 is captured between the seal retainer 40 and a washer 60 supported on the first valve stem 28. In normal operation where the first control portion 18 is either fully open, as illustrated in FIG. 2 or fully closed, as illustrated in FIG. 4, the excess flow spring 58 in its extended condition, maintaining a bias urging the valve holder 32 against the nut 34, and therefore maintaining a seal between the nut 34 and the excess flow seal 36. In certain conditions, such as described above during a pilot valve operation, the excess flow spring 58 may be compressed, and the valve holder 32 may be spaced from the nut 34 along the first valve stem 28 opening a space between the nut 34, the excess flow seal 36 and the first valve stem 28 for fluid to flow.

The fluid flow out of the tank and through the combination valve 10 applies a force, or bias, to the valve holder 32. Where the fluid flow is unrestrained, for example, by a failure in a downstream pipeline component, the force, or bias, caused by the fluid may be greater than the excess flow spring 58 can resist, compressing the excess flow spring 58, and causing the valve holder 32 to retract along the first valve stem 28 away from the nut 34. The movement of valve holder 32 along the first valve stem 28 is greater than the length of the rapid equalization portion 56 along the first valve stem 28.

Figure 3:
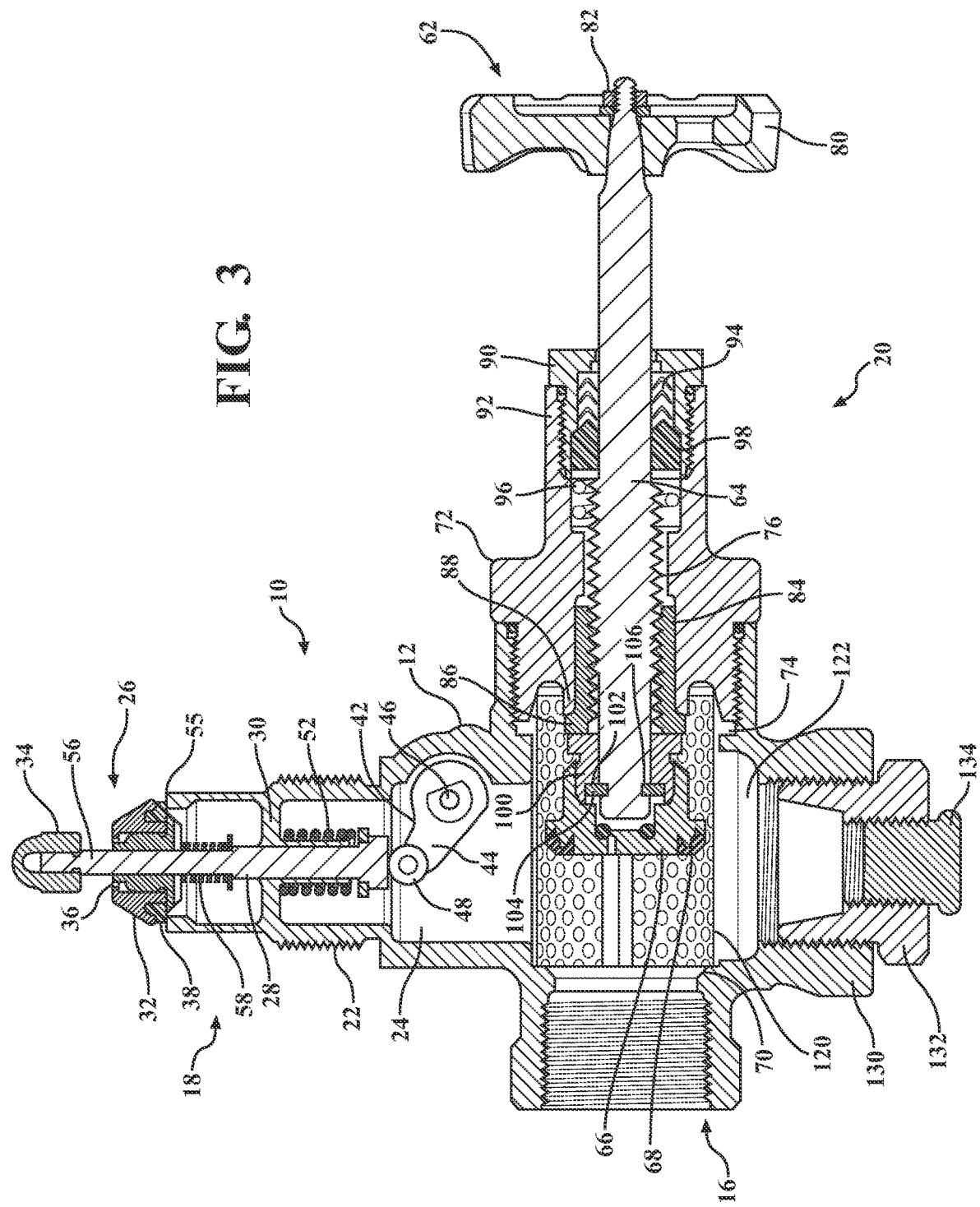
FIG. 3 is a vertical cross-sectional view of the combination valve assembly of FIG. 1 with the first control portion in an excess flow condition and the second control portion in an open position.

In the excess flow condition, the valve holder 32 moves along the first valve stem 28 beyond the rapid equalization portion 56, as illustrated in FIG. 3. The first valve stem 28 beyond the rapid equalization portion 56 is sized to engage with the excess flow seal 36 to limit the amount of fluid bleed from the tank to the interior chamber 24. The actuator 42 remains in the open position, extending the first valve stem 28 and compressing the valve spring 52. The valve holder 32 retracts along the first valve stem 28, compressing the excess flow spring 58. The combination valve 10 limits the fluid flow until the actuator 42 can be toggled to the closed position, fully closing the combination valve 10.

Fluid passing through the combination valve 10 flows between the first control portion 18 and the second control portion 20. The second control portion 20 provides a variable control of fluid flow at the second opening 16 of the combination valve 10. Where the combination valve 10 is mounted to the outlet of a storage or transportation tank, the second opening 16 is the outlet of the combination valve 10, and is connected to a pipeline (not shown) for delivering the fluid stored in the tank.

The second control portion 20 includes a second valve member 62 movable relative to the housing body 12. The second control portion 18 may be understood as similar to what is known in the industry as a globe valve. The second valve member 62 may be a plug or disk to close the second opening 16. The second valve member 62 may include a second valve stem 64 extending through the interior chamber 24 of the housing body 12. The second valve member 62 further includes a valve head 66 supported on the second valve stem 64. The valve head 66 includes a second valve seal 68 and is moveable between a closed position and an open position. The valve head 66 is illustrated in the closed position in FIG. 2 where the second valve seal 68 is in contact with the internal valve seat 70 and there is no fluid communication between the interior chamber 24 and the second opening 16. The valve head 66 is illustrated in the open position in FIG. 3 where the where second valve seal 68 is spaced apart from the internal valve seat 70.

The second valve member 62 is removably coupled to the housing body 12 by a bonnet 72. In the illustrated configuration, the housing body 12 and the bonnet 72 include complementary threads so that the bonnet 72 screws into the housing body 12. In alternative configurations, the bonnet 72 may secure to the housing in any other suitable manner. For example, the housing body 12 and the bonnet 72 may include corresponding flanges which may be secured together with threaded fasteners such as machine screws or bolts. One example of such an arrangement is illustrated in U.S. Pat. No. 8,596,301, issued Dec. 3, 2013, the disclosure of which is incorporated by reference in its entirety herein. A gasket, such as gasket 74, or other sealing member, may be provided at the interface of the housing body 12 and the bonnet 72 to ensure a leak free connection. In other alternatives, the bonnet 72 and the housing body 12 may be secured using a union connection.

The second valve stem 64 is positioned in a throughbore 76 of the bonnet 72. The second valve stem 64 can control the position of the valve head 66 between the open and the closed positions. The second valve stem 64 can include a threaded portion 78 so that the valve head 66 can be advanced or retracted by rotation of the second valve stem 64. In the Figures, the second valve stem 64 is provided with a hand wheel 80 for manually rotating the second valve stem 64. The hand wheel 80 can be retained to the second valve stem 64 by a fastener. The second valve stem 64 may include a threaded feature at its end to secure the hand wheel 80, such as with a nut 82. In alternative configurations, the second valve stem 64 can be mechanically controlled by an external actuator (not shown), motor, solenoid, gearing, or the like. In some alternatives, the second valve stem 64 may be smooth sided, and controlled externally by an actuator (not shown) arranged to translate the second valve stem 64 linearly in a direction defined by a longitudinal axis of the second valve stem 64.

In the illustrated configuration, the threaded portion 78 of the second valve stem 64 is engaged with a threaded sleeve 84. The threaded sleeve 84 may include a shoulder 86 to engage with an interior end 88 of the throughbore 76. In alternative configurations, the bonnet 72 may include a threaded portion of the throughbore 76 to engage the second valve stem 64. The second valve stem 64 may be rotated clockwise to move the valve head 66 to the closed position, and counterclockwise to move the valve head 66 to the open position. This allows the valve head 66 to be positioned at any intermediate location between the open position and the closed position in controlling the fluid flow between the interior chamber 24 and the second opening 16.

A bushing 90 is retained to the exterior end 92 of the bonnet 72 by, for example, threaded engagement or press fit engagement. The second valve stem 64 extends through the bushing 90 and is sealed thereto for preventing fluid leak along the second valve stem 64 through the bonnet 72 from the interior chamber 24. One or more bushing seals 94 seal between the second valve stem 64 and the bushing 90. An expander spring 96 is disposed in the bonnet throughbore 76 against a seal expander 98 biasing the busing seals 94 toward the exterior end 92 of the bonnet 72. An end of the seal expander 98 is generally tapered to press against the bushing seals 94 due to the bias of the expander spring 96 such that the seal expander 98 spreads the bushing seals 94 into simultaneous contact with the bushing 90 and the second valve stem 64.

The valve head 66 is retained to the second valve stem 64 with the valve head bushing 100. The valve head bushing 100 includes a recess 102 in which a washer, such as a C-washer 104, is captured when the valve head bushing 100 is secured to the valve head 66 by threaded engagement or press-fit engagement. The C-washer 104 is retained in a constriction 106 of the second valve stem 64. The constriction 106 of the second valve stem 64 may be arranged to securely retain the C-washer 104 to the second valve stem 64. For example, the length of the constriction 106 along the second valve stem 64 may be substantially the same as a thickness of the C-washer 104. The recess 102 of the valve head bushing 100 may extend greater than the thickness of the C-washer 104 to create a travel space of the valve head 66 relative to the second valve stem 64. In alternative configurations, the travel space may be created by a constriction 106 greater in length than the thickness of the C-washer 104, where the recess 102 of the valve head bushing 100 tightly secures the C-washer 104.

Figure 5:
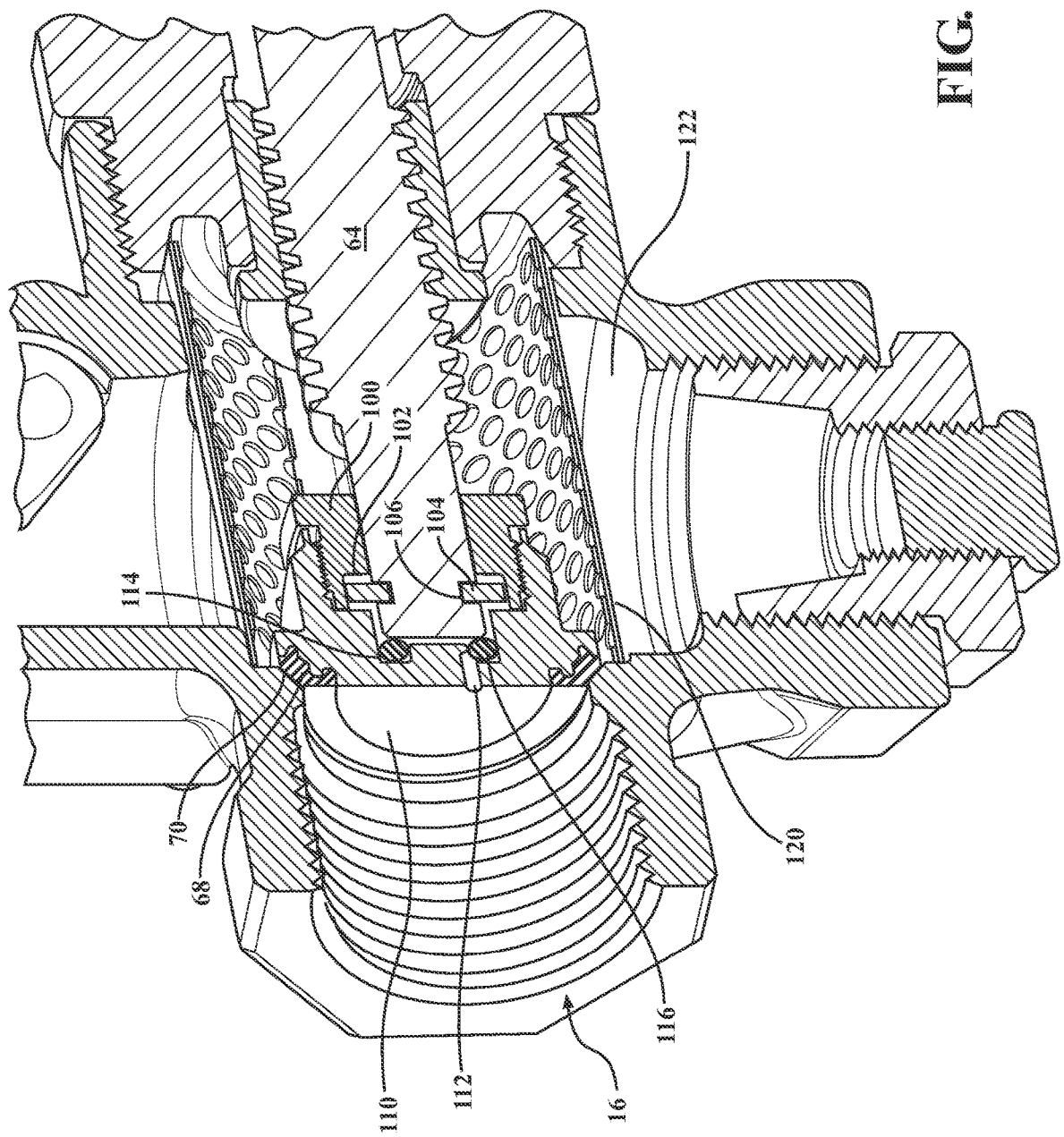
FIG. 5 is a partial perspective cross-sectional view of the combination valve assembly of FIG. 1 with the second control portion in the closed position.

The combination valve 10 may include a valve head 110 having a pilot feature that provides pressure equalization when the second control portion 20 is in the closed position and first moved toward the open position. The valve head 110 with pilot feature is illustrated in detail in FIG. 5. The valve head 110 includes a bore 112 open to the second opening 16. The bore 112 opens at its opposite end into a recess 114 of the valve head 110. An O-ring 116 is disposed in the recess 114. In the illustrated configuration, the recess 114 extends concentrically within the valve head 110 and lies symmetrically about a longitudinal axis defined by the second valve stem 64. The bore 112 therefore is off-center relative to the valve head 110.

The second valve stem 64 seals against and compresses the O-ring 116 to close the bore and prevent fluid communication therethrough in the closed position. When the second valve stem 64 is rotated to move the second control portion 20 from the closed position to an open position, the second valve stem 64 first disengages from the O-ring 116, opening the bore 112 and allowing fluid exchange between the interior chamber 24 and the second opening 16. This initial fluid exchange upon a rotation of the second valve stem 64 allows pressure equalization between the interior of the combination valve 10 and the pipeline system connected at the second opening 16. Upon further rotation of the second valve stem 64, the travel space at the C-washer 104 is taken up and the valve head 110 moves out of contact with the internal valve seat 70, opening the combination valve 10 for full flow fluid exchange between the interior chamber 24 and the second opening 16.

The combination valve 10 includes a strainer 120 as a filtering element to separate particulates and undesired substances from the fluid as the fluid moves through the combination valve 10. The strainer 120 may be substantially cylindrical to encircle the second control portion. Although illustrated as cylindrical, other suitable forms of the strainer 120 are possible, including rectangular, hexagonal, or other suitable cross-sections. Where the combination valve 10 is installed in the outlet of a tank, such as a storage or transportation tank, the strainer 120 can exclude unwanted contaminates from entering the downstream pipeline system. As the fluid moves out of the tank and into the combination valve, the strainer 120 prevents the unwanted contaminates from flowing out of the second opening 16 with the fluid, instead trapping the contaminates in the interior chamber 24. The particulate matter separated from the fluid flow may collect in a clean-out area 122 of the interior chamber 24.

The housing body 10 includes flared side walls 124 surrounding the second control portion 20 to provide a fluid flow path through the combination valve 10 that allows the fluid to flow through the entire periphery of the strainer 120, rather than being limited to flowing through the strainer 120 on the side closest to the first control portion 18. To maintain consistent flow characteristics through the combination valve 10, the geometry of the housing body 12 may be arranged to provide a substantially constant cross section to the fluid flow pathway. For example, in some configurations, the fluid flow cross section at the first opening 14, when the first control portion 18 is in the open position, provides the same area of the fluid flow cross section at the second opening 16 when the second control portion 20 is in the open position. Throughout the fluid flow pathway between the first opening 14 and the second opening 16, the fluid flow cross section does not decrease below the magnitude at the openings, including as the fluid flows through the strainer 120.

Figure 6:
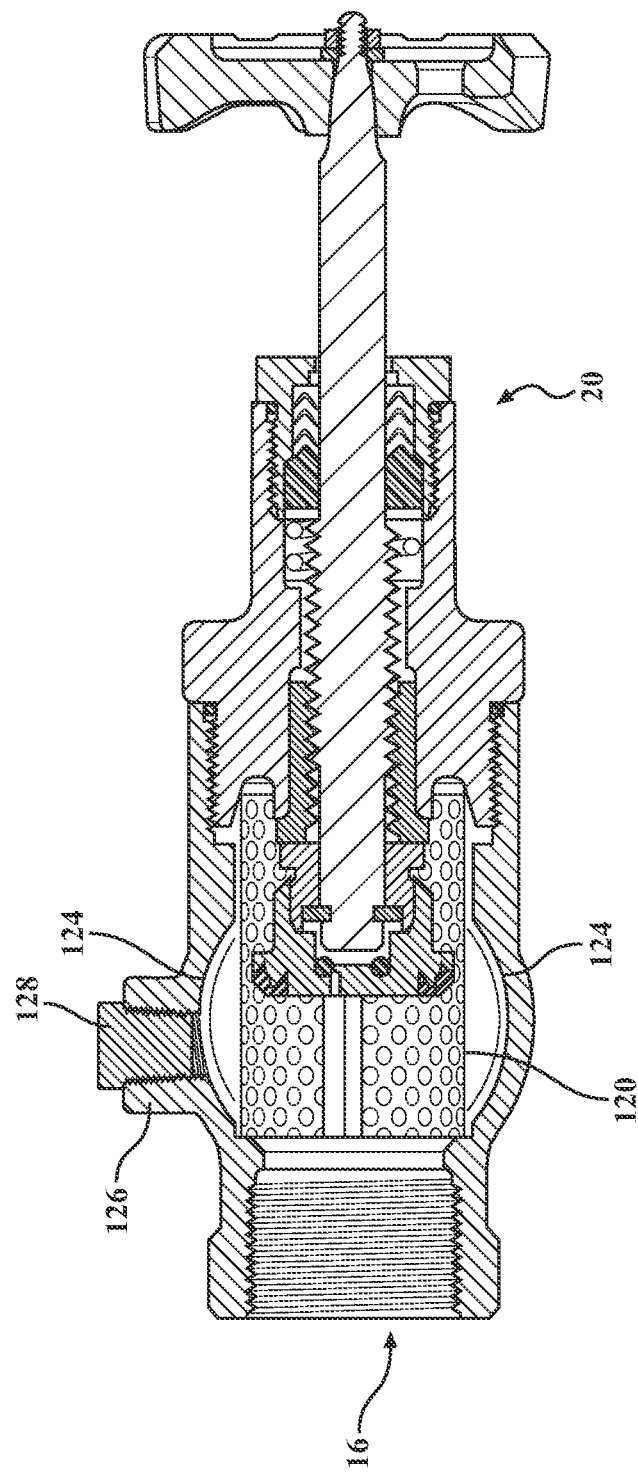
FIG. 6 is a horizontal cross-sectional view of the combination valve assembly of FIG. 1 in the third configuration.

It may be desirable to clean out the strainer 120 from time to time to ensure unobstructed flow through the combination valve 10. In a first alternative, the bonnet 72 may be removed from the housing body 12, for example, by unscrewing the bonnet 72. This allows the strainer 120 to be extracted from the interior chamber 24 to be cleaned or replaced. In other alternatives, or for maintenance, the housing body 12 may be provided with clean-out ports. For example, a side clean-out port 126 may be disposed in the flared side wall 124 at the level of the strainer 120. This side clean-out port 126 is illustrated in FIG. 6, with a plug 128 installed. The side clean-out port 126 may include internal threading to receive and retain a threaded plug 128. A further clean-out port 130 may be provided adjacent the clean-out area 122. As illustrated in the Figures, the clean-out port 130 may be disposed opposite the first opening 14. The clean-out port 130 may be threaded to receive a threaded plug 134 to close the combination valve 10 during normal operation. In one alternative, a threaded adapter 132 may be provided in the clean-out port 130 with the threaded plug 134. In other alternatives, clean out ports may be provided in the housing body 12 having different configurations, including press-fit plugs, or other capping alternatives.

The clean-out port 130 may be alternatively employed as a piping connection. The clean-out port 130 may be threaded using standard thread connection sized and a second pipeline connection (not shown) may be made using the clean-out port 130. Using the clean-out port 130 as a secondary connection can bypass the second control portion 20, so that only the first control portion 18 controls the fluid flow into the combination valve 10 and out of the clean-out port 130. In other alternatives, the combination valve can include a first pipeline connection at the second opening 16 and a second pipeline connection at the clean-out port 130. In this example, the second control portion 20 controls the fluid flow through the second opening 16. Other flow control devices (not shown) can be provided downstream of the combinations valve 10 from the clean-out port 130 where the clean-out port 130 is used as a pipeline connection.

In one example procedure, cleaning the combination valve 10 may include closing the first and second openings 14, 16 and applying a flow of compressed air through the clean-out ports 126, 130. In this procedure, the first control portion 18 is toggled to close the first valve member 26, preventing fluid communication through the first opening 14. The second control portion 20 is likewise moved to the closed position, preventing fluid communication through the second opening 16. The threaded plugs 128 and 134 are removed from their clean out ports 126, 130. The threaded adapter 132, if present, can remain in place during the clean out procedure. An air hose or nozzle (not shown) is inserted at the clean-out port 128, and a flow of high-pressure air is applied. Any debris collected in the housing body 12 or accumulated on the exterior of the strainer 120 is thus driven out of the combination valve 10 by the airflow to exit at the clean-out port 130.

The combination valve 10 as described and shown in the Figures may advantageously alleviate several disadvantages found in conventional valve systems by eliminating joints between components and minimizing weight and size. The above description is not intended to be limiting to a particular size or arrangement of components. For example, the first and second openings 14, 16 may be scaled to a standard piping size, such as 1 inch, 1¼ inch, 2 inch, 3 inch or otherwise. Likewise, the described threaded interfaces may be scaled to standard thread sizes, for example, as specified by the American National Pipe Thread Standards. In certain configurations, it may be desirable to integrate a size change between the first opening 14 and the second opening 16 in certain applications. For example, in one configuration, the first opening 14 may be arranged such that the external threads 22 are 1¼ inch male national pipe taper threads and the second opening 16 includes 1 inch female national pipe taper threads. Other combinations are contemplated and within the scope of the present disclosure.

The attached Figures illustrate the combination valve 10 arranged such that the first control portion 18 and the second control portion 20 are in a common vertical plane and are oriented substantially perpendicular to each other. That is, the fluid flow pathway through the first opening 14 is disposed to be at an angle of substantially 90° from the fluid flow pathway through the second opening 16. This is not intended to be limiting and other arrangements are contemplated by the present disclosure. For example, the second opening 16 may be arranged at an angle other than 90° from the first opening 14. In one specific example, the first opening 14 may be arranged in a straight-line configuration with the second opening 16. In this example, the second control portion 20 may be arranged at an oblique angle to the fluid flow pathway. Additionally, the second control portion 20 may be arranged to be adjacent or oblique to the first control portion such that the two control portions do not lie in a common vertical plane.

The above description has been provided using the common names for structures recognized in the relevant industry. These structural components have well understood meanings, including understood material makeups, and methods for manufacturing. For example, the housing body 12 may be formed of metal for petrochemical applications. For other fluids, such as clean water applications, the housing body 12 may be formed of plastic, such as PVC. Similarly, components like valve springs and valve seals have recognized meaning in the industry, including recognized suitable materials and manufacturing methods, depending on the intended application.

The above description is provided in an illustrative manner, and it is to be understood that the terminology which has been used is intended to be in the nature of words of description rather than of limitation. Many modifications and variations of the present disclosure are possible in light of the above teaching, and may be practiced other than as specifically described.

What is claimed is:

1. A combination valve comprising:
a housing body defining a first opening and a second opening;
a first control portion disposed at the first opening controlling fluid flow through the first opening;
a second control portion disposed at the second opening controlling fluid flow through the second opening;
wherein the housing body comprises a fluid flow pathway between the first opening and the second opening, wherein the fluid flow pathway through the second opening is substantially perpendicular to the fluid flow pathway through the first opening; and
a rotatable cam actuator mounted to the housing body and in contact with the first control portion, the cam actuator arranged to move the first control portion from a closed position to an open position.

2. The combination valve of claim 1, wherein the first and second control portion operate independently of each other.

3. The combination valve of claim 1, further comprising a filter element disposed between the first opening and the second opening.

4. The combination valve of claim 3, wherein the filter element is substantially cylindrical and is disposed to encircle the second control portion.

5. The combination valve of claim 1, wherein the housing body comprises a clean-out area adjacent to a fluid flow pathway between the first opening and the second opening.

6. The combination valve of claim 5, further comprising at least one clean-out port.

7. A combination valve assembly comprising:
a housing body defining a first opening, a second opening, and an internal chamber;
a poppet disposed at the first opening for controlling fluid flow between the first opening and the internal chamber;
a plug disposed at the second opening for controlling fluid flow between the second opening and the internal chamber;
wherein the housing body comprises a fluid flow pathway between the first opening and the second opening, wherein the fluid flow pathway through the second opening is substantially perpendicular to the fluid flow pathway through the first opening; and
wherein the poppet comprises a valve seal located externally to the housing body, a valve stem coupled to the valve seal and arranged to translate linearly relative to the housing body, and an actuator mounted to the housing body and in contact with the valve stem to move the valve stem from a closed position to an open position, wherein the valve stem is moved to the closed position to contact the valve seal with an external valve seat on the housing body.

8. A combination valve assembly comprising:
a housing body defining a first opening, a second opening, and an internal chamber;
a poppet disposed at the first opening for controlling fluid flow between the first opening and the internal chamber;
a plug disposed at the second opening for controlling fluid flow between the second opening and the internal chamber; and
wherein the plug comprises a valve head including a pilot to equalize pressure between the internal chamber and the second opening when the plug is first moved from a closed position to an open position.

9. A combination valve assembly comprising:
a housing body defining a first opening, a second opening, and an internal chamber;
a poppet disposed at the first opening for controlling fluid flow between the first opening and the internal chamber;
a plug disposed at the second opening for controlling fluid flow between the second opening and the internal chamber; and
wherein the poppet comprises a valve stem comprising a rapid equalization portion, and a valve holder movable along the valve stem to selectively engage the rapid equalization portion.

10. A combination valve assembly comprising:
a housing body defining a first opening, a second opening and an interior chamber disposed between the first and second openings, wherein the first opening comprises an external valve seat external to the housing body and the second opening defined an internal valve seat internal to the housing body, wherein the housing body comprises a fluid flow pathway between the first opening and the second opening, wherein the fluid flow pathway through the second opening is substantially perpendicular to the fluid flow pathway through the first opening;
a first valve member disposed at the first opening for controlling fluid flow through the first opening, the first valve member movable relative to the housing body between a closed position and an open position, the first valve member including a first valve seal, wherein the first valve seal is in contact with the external valve seat when the first valve member is in the closed position;
a second valve member disposed at the second opening for controlling fluid flow through the second opening, the second valve member movable relative to the housing body between a closed position and an open position; the second valve member including a second valve seal; wherein the second valve seal is in contact with the internal valve seat when the second valve member is in the closed position; and
wherein the first valve member comprises a valve stem coupled to the first valve seal and arranged to translate linearly relative to the housing body and an actuator mounted to the housing body and in contact with the valve stem to move the valve stem and first valve seal from the closed position to the open position.

11. A combination valve assembly comprising:
a housing body defining a first opening, a second opening and an interior chamber disposed between the first and second openings, wherein the first opening comprises an external valve seat external to the housing body and the second opening defined an internal valve seat internal to the housing body;
a first valve member disposed at the first opening for controlling fluid flow through the first opening, the first valve member movable relative to the housing body between a closed position and an open position, the first valve member including a first valve seal, wherein the first valve seal is in contact with the external valve seat when the first valve member is in the closed position;
a second valve member disposed at the second opening for controlling fluid flow through the second opening, the second valve member movable relative to the housing body between a closed position and an open position; the second valve member including a second valve seal; wherein the second valve seal is in contact with the internal valve seat when the second valve member is in the closed position;
a first valve stem arranged to translate linearly relative to the housing body;
a cam actuator mounted to the housing body and in contact with the first valve stem, the cam actuator arranged to move the first valve stem from a closed position to an open position;
a valve spring arranged to bias the first valve stem toward the closed position;
a valve holder retained to the first valve stem; and
a first valve seal supported on the valve holder.

12. The combination valve assembly of claim 11, wherein valve holder is retained to the first valve stem with a nut, the first valve member comprises an excess flow seal supported on the valve holder; an excess flow spring is supported on the first valve stem and biases the valve holder toward the nut and wherein the first valve stem includes a rapid equalization portion; and wherein in a first condition the excess flow spring is at a first extended length and the excess flow seal seals against the nut; in a second condition the excess flow spring is at a second compressed length where the valve holder is spaced from the nut and adjacent the rapid equalization portion of the first valve stem; and in a third condition the excess flow spring is at a third compressed length, more compressed than the second compressed length, the valve holder is spaced from the nut more than in the second condition.

13. A combination valve assembly comprising:
a housing body defining a first opening, a second opening and an interior chamber disposed between the first and second openings, wherein the first opening comprises an external valve seat external to the housing body and the second opening defined an internal valve seat internal to the housing body;
a first valve member disposed at the first opening for controlling fluid flow through the first opening, the first valve member movable relative to the housing body between a closed position and an open position, the first valve member including a first valve seal, wherein the first valve seal is in contact with the external valve seat when the first valve member is in the closed position;
a second valve member disposed at the second opening for controlling fluid flow through the second opening, the second valve member movable relative to the housing body between a closed position and an open position; the second valve member including a second valve seal; wherein the second valve seal is in contact with the internal valve seat when the second valve member is in the closed position;
a second valve stem arranged to rotate relative to the housing body;
a bonnet retaining the second valve stem to the housing body, the second valve stem including a threaded portion and the bonnet including corresponding threads to engage the second valve stem;
a valve head supported on the second valve stem; and
a second valve seal supported on the valve head.

14. The combination valve assembly of claim 13, wherein the valve head is retained to the second valve stem by a valve head bushing, and a C-washer mounted in a constriction of the second valve stem; wherein one of the valve head bushing or the constriction comprises a travel space of the valve head relative to the valve stem; the valve head further comprising a bore extending through the valve head.

15. The combination valve assembly of claim 14, wherein the valve head further comprises a recess and an O-ring disposed in the recess; further wherein the bore is arranged in the recess.

16. The combination valve of claim 15, wherein in a first condition the second valve stem seals against the O-ring to block fluid communication through the bore; and in a second condition, the second valve stem unseals from the O-ring to permit fluid communication through the bore.

17. The combination valve of claim 15, wherein the bore is off-centered on the valve head.

18. A combination valve comprising:
a housing body defining a first opening, a second opening and an interior chamber disposed between the first and second openings, wherein the first opening comprises an external valve seat external to the housing body and the second opening defined an internal valve seat internal to the housing body;
a first valve member disposed at the first opening for controlling fluid flow through the first opening, the first valve member movable relative to the housing body between a closed position and an open position, the first valve member including a first valve seal, wherein the first valve seal is in contact with the external valve seat when the first valve member is in the closed position;
a second valve member disposed at the second opening for controlling fluid flow through the second opening, the second valve member movable relative to the housing body between a closed position and an open position; the second valve member including a second valve seal; wherein the second valve seal is in contact with the internal valve seat when the second valve member is in the closed position; and
a strainer disposed between the first valve member and the second valve member.

19. A combination valve comprising:
a housing body defining a first opening, a second opening and an interior chamber disposed between the first and second openings, wherein the first opening comprises an external valve seat external to the housing body and the second opening defined an internal valve seat internal to the housing body;
a first valve member disposed at the first opening for controlling fluid flow through the first opening, the first valve member movable relative to the housing body between a closed position and an open position, the first valve member including a first valve seal, wherein the first valve seal is in contact with the external valve seat when the first valve member is in the closed position;
a second valve member disposed at the second opening for controlling fluid flow through the second opening, the second valve member movable relative to the housing body between a closed position and an open position; the second valve member including a second valve seal; wherein the second valve seal is in contact with the internal valve seat when the second valve member is in the closed position;
a clean-out area of the interior chamber;
a first clean-out port formed in the housing body; and
a second clean out port formed in the housing body.

* * * * *